United States Patent Office 2,848,485
Patented Aug. 19, 1958

2,848,485

HYDROGENATED POLYCARBOXYLIC DERIVATIVES OF CYCLODIENES

Charles A. Cohen, Roselle Park, N. J., assignor to Esso Research and Engineering Company, a corporation of Delaware No Drawing. Application May 23, 1955
Serial No. 510,561

9 Claims. (Cl. 260—514)

This invention relates to hydrogenated polycarboxylic derivatives of cyclodienes such as tetrahydrodicyclopentadiene-dicarboxylic acid and esters and salts thereof.

Unsaturated polycarboxylic acids such as alpha-dicyclopentadiene-dicarboxylic acid and the corresponding derivative of methylcyclopentadiene are well known. A particularly effective process for making such acids is described in copending application Serial No. 268,122 of Cohen and Mikeska, which was filed on January 24, 1952, now Patent No. 2,716,662 (reissued as Reissue Patent No. 24,123), and of which the present application is a continuation-in-part. Briefly stated, this prior process involves making a cyclodienyl sodium compound by reacting monomeric cyclopentadiene with very finely divided metallic sodium in the presence of a small amount of an anhydrous alcohol as an activator, whereupon the dienyl sodium compound is carboxylated with the aid of carbon dioxide to produce the corresponding sodium salt of the acid. Finally the desired carboxylic acid can be sprung from the sodium salt by addition of hydrochloric acid or the like.

The resulting dicyclopentadiene-dicarboxylic acid, which has one carboxyl group on each of the cyclopentadiene nuclei constituting the dicyclopentadiene structure and is usually a mixture of endo and exo isomers, has been found useful as a substitute for phthalic or maleic acids in a variety of reactions, as a starting material in the manufacture of polyester type lubricants and resins, and particularly in the manufacture of modified alkyd resins. However, in many of these uses the dicyclopentadiene dicarboxylic acid has had various shortcomings. For instance, the previously known acids of this type have tended to undergo partial cracking, decarboxylation, as well as undesirable gellation when heated. As a result, products prepared therefrom by means of high temperature reactions frequently have lacked uniformity and may have exhibited undesirably dark color.

It has now been discovered that hydrogenation of the aforementioned dicyclopentadiene dicarboxylic acid or of its alkyl substituted homologues gives dicarboxylic acids which are surprisingly more stable and otherwise superior to the original unhydrogenated acids in a variety of respects. For instance, unlike the unhydrogenated acids, the corresponding di- or tetra-hydrogenated compounds form perfectly stable diesters of alcohols of 1 to 13 carbon atoms, e. g. methyl, ethyl, isooctyl, tridecyl, etc., which may be distilled without cracking, decarboxylation or polymerization.

The basic raw material from which the compounds of this invention can be derived includes dicarboxylated dimers of cyclopentadiene, alkyl-substituted cyclopentadiene and mixtures thereof. Of foremost practical importance at present are dicyclopentadiene dicarboxylic acid, dimethyldicyclopentadiene dicarboxylic acid, which is a derivative of methylcyclopentadiene, and methyldicyclopentadiene dicarboxylic acid, which is a derivative of a mixture of cyclopentadiene and methylcyclopentadiene. As already mentioned, the preparation of these dicyclodiene dicarboxylic acids was described previously and need not be repeated here since in itself it does not form a part of the present invention. On the contrary, the present invention relates to the acids which can be obtained by hydrogenating the known dicyclodiene acids in such a manner that at least one, but preferably both of the double bonds originally present are saturated with hydrogen. This hydrogenation can be illustrated by the following equations:

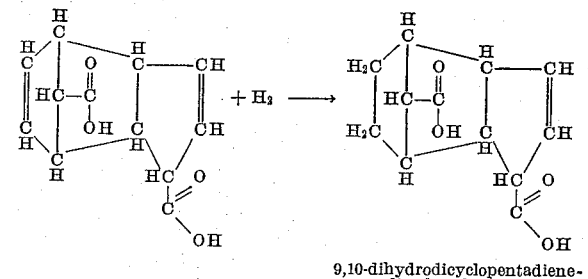

9,10-dihydrodicyclopentadiene-dicarboxylic acid

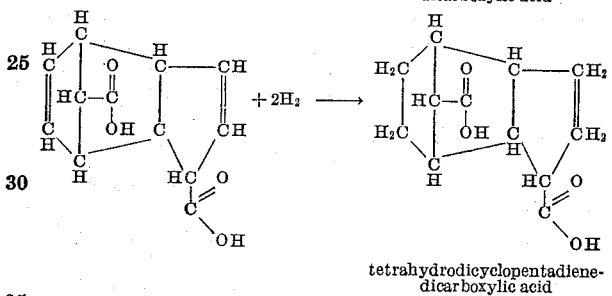

tetrahydrodicyclopentadiene-dicarboxylic acid

The nomenclature used here is the same as explained in the aforesaid Patent No. 2,716,662, though the formulas are used here primarily for purposes of illustrations and may not necessarily represent the exact molecular structures.

Either the dihydrogenated or the tetrahydrogenated acid can be made, depending on the amount of hydrogen allowed to react. When the hydrogenation is carried out, it proceeds in two distinct stages, and formation of the tetrahydrogenated acid normally does not begin until after the original acid was completely converted to the dihydroacid. Since the hydrogenation of the first double bond is substantially easier than the hydrogenation of the second double bond, the transition point between the two stages of the hydrogenation can be determined by following the hydrogen pressure drop. If it is desired to prepare the dihydro acid, either the proper amount of one mole of hydrogen per mole of acid can be charged to begin with, or an excess of hydrogen may be charged and the hydrogenation may be arrested as soon as a significant change in the rate of hydrogenation is observed.

The reaction proceeds similarly when the corresponding derivatives of methylcyclopentadiene and related more highly alkylated cyclopentadienes are used.

The hydrogenation can be carried out at hydrogen pressures of about atmospheric to 2000 p. s. i. g., preferably at 15 to 150 p. s. i. g., and with the aid of various catalysts such as Adams platinum oxide ($PtO_2$), Raney nickel, etc. Also, since the dicyclodiene dicarboxylic acids are relatively high melting solids, it is advantageous to add a suitable solvent to the reaction mixture in a quantity sufficient to dissolve the original dicarboxylic acid. Suitable solvents include alcohols such as methanol, ethanol, and isopropanol as well as other inert oxygenated solvents such as acetic acid, dioxane, ether, tetrahydrofuran, etc. The amount of solvent added may equal about 5 to 50 times the weight of the dicarboxylic acid. The hydrogenation is carried out at temperatures between about 20 to 100° C., preferably 30 to 80° C.

The actual working and nature of the invention is particularly illustrated by the following preparation of tetrahydrodicyclopentadienedicarboxylic acid. In this example, as throughout this entire specification, it will be understood that all amounts, proportions and percentages of materials are expressed on a weight basis unless indicated otherwise.

22 grams (0.1 mol) of dicyclopentadienedicarboxylic acid formed as described in U. S. Patent 2,716,662 was dissolved in 315 grams of anhydrous ethanol in a pressure bottle having a capacity of 1300 ml. and connected to a hydrogen storage tank having a capacity of 6810 ml. The free space in the system was 7625 ml. The dicarboxylic acid used was a white crystalline solid having a melting point of 210° C. and a neutralization equivalent of 509 mgm. KOH/gm. 100 mgm. of Adams $PtO_2$ catalyst was added to the alcoholic solution of the acid, the air exhausted from the bottle and the system was then filled with hydrogen to a pressure of 41 p. s. i. g. On shaking, there was an immediate absorption of hydrogen until the pressure dropped to 31.5 p. s. i. g., representing 0.2 mol of hydrogen absorbed in a period of about 30 minutes. The hydrogen pressure was observed to drop at a more rapid rate in the first part, corresponding to the formation of the dihydroacid, than in the latter part. At the end of the reaction the reaction mixture was filtered to separate the catalyst from the alcoholic solution and the alcohol was evaporated from the solution on a steam bath under an atmosphere of nitrogen. The solid residue was dissolved in 100 ml. of 50% ethanol and recrystallized.

The resulting tetrahydrodicyclopentadiene dicarboxylic acid product was recovered in an essentially quantitative yield in the form of snow white crystals, having a melting point of 193–194° C. on a copper bar. Titration of a sample weighing 0.3143 grams required 27.15 ml. of 0.1034 N alkali. This corresponds to an equivalent weight of 112.0 as against a theoretical weight of 112.1. A test for unsaturation by reaction with bromine indicated that the product was completely saturated. These analytical results are indicative of the high purity of the hydrogenated acid obtained.

The 9,10-dihydrodicyclopentadiene dicarboxylic acid was prepared in the same manner as just described, except that hydrogen was charged in an amount equal to only one mole per mole of dicyclopentadiene dicarboxylic acid. The separated product was recovered in the form of white crystals upon recrystallization from alcohol. When tested with bromine, it showed an unsaturation corresponding to one double bond per mole of the dicarboxylic acid product. The dihydroacid remained stable when heated under a blanket of nitrogen at a temperature of 250° C. for periods of 30 minutes and more, whereas the original unhydrogenated dicyclopentadiene dicarboxylic acid tends to decarboxylate and depolymerize at temperatures as low as 200° C. This increased stability is of great importance when the acid is to be used in various high temperature reactions such as the preparation of polyesters, etc.

Methyl esters of the unsaturated and fully saturated acids were prepared by refluxing the respective acids for six hours with an excess of methanol containing a small amount of sulfuric acid, removing the alcohol and inorganic acid and crystallizing from petroleum ether. Distillation of the two esters showed no decomposition for the hydrogenated material whereas the unhydrogenated ester cracked severely.

Having described the nature, operation and utility of the invention in a general manner and also in terms of specific illustrative examples, it will be apparent that various modifications thereof can be made without departing from the scope and spirit hereof. The claimed invention is particularly pointed out in the appended claims.

What is claimed is:

1. A hydrogenated derivative of a dicarboxylic acid selected from the group consisting of dicyclopentadiene dicarboxylic acid, dimethyldicyclopentadiene dicarboxylic acid and methyldicyclopentadiene dicarboxylic acid, said acid having one carboxyl group attached to a bridged $C_6$ ring, one carboxyl group attached to a $C_5$ ring fused to said $C_6$ ring, and having at least the $C_6$ ring saturated with hydrogen.

2. Tetrahydrodicyclopentadien dicarboxylic acid characterized by having one carboxyl group attached to each dicyclopentadiene nucleus ring and having a melting point of 193–194° C., said dicyclopentadiene nucleus consisting of a bridged $C_6$ ring fused to a $C_5$ ring.

3. Tetrahydrodimethyldicyclopentadiene dicarboxylic acid having one carboxyl group on each of the cyclopentadiene nuclei constituting the dicyclopentadiene structure.

4. 9,10-dihydro-dicyclopentadiene dicarboxylic acid.

5. A process for making tetrahydrodicyclopentadiene dicarboxylic acid having one carboxyl group attached to a $C_5$ ring and the other to a bridged $C_6$ ring of the dicyclopentadiene nuclear structure which comprises forming a liquid solution of dicyclopentadiene dicarboxylic acid having one carboxyl group in each of said rings of the dicyclopentadiene structure in an inert organic solvent and contacting the solution with hydrogen under pressure and at a temperature of 20 to 100° C. in the presence of a hydrogenation catalyst.

6. A process for hydrogenating a dicarboxylic acid having a dicyclopentadiene nucleus selected from the group consisting of dicyclopentadiene dicarboxylic acid, dimethyldicyclopentadiene dicarboxylic acid and methyldicyclopentadiene dicarboxylic acid, which comprises contacting a liquid solution of the dicarboxylic acid in an inert organic solvent with hydrogen under pressure with a temperature of 20 to 100° C. in the presence of a hydrogenation catalyst until at least one mole of hydrogen is reacted per mole of the acid so as to form the resulting dihydro acid derivative by saturation of one double bond in the dicyclopentadiene nucleus.

7. A process for hydrogenating a dicyclopentadiene dicarboxylic acid, said dicarboxylic acid having been formed by the reacting cyclopentadienyl sodium with carbon dioxide to produce the sodium salt of dicyclopentadiene dicarboxylic acid and acidifying said salt, which comprises contacting the dicyclopentadeine dicarboxylic acid with hydrogen under pressure at a temperature of 20 to 100° C. in the presence of a hydrogenation catalyst until a mole of the acid is reacted with a mole of hydrogen to saturate one double bond in the ring nucleus of the dicarboxylic acid, thus forming 9,10-dihydro-dicyclopentadiene dicarboxylic acid.

8. The process of claim 7, in which the dihydrodicyclopentadiene dicarboxylic acid is contacted with additional hydrogen under reaction conditions, temperature and pressure to form a tetrahydrocyclopentadiene dicarboxylic acid.

9. A process for making tetrahydrodicyclopentadiene dicarboxylic acid having one carboxyl group in each cyclopentadiene ring nucleus of the dicyclopentadiene structure which comprises dissolving dicyclopentadiene dicarboxylic acid having one carboxyl group in each cyclopentadiene ring nucleus of the dicyclopentadiene structure in anhydrous ethanol and contacting the resulting solution with an excess of hydrogen gas under pressure at a temperature between 30° and 80° C. in the presence of Adams platinum oxide catalyst until 4 atoms of hydrogen are combined per mole of the dicyclopentadiene acid, mechanically separating the catalyst from the reaction mixture, and recovering the tetrahydrodicyclopentadiene dicarboxylic acid by evaporating the alcohol from the catalyst-free reaction mixture.

References Cited in the file of this patent

UNITED STATES PATENTS

| | | |
|---|---|---|
| 2,675,390 | Rosenblatt | Apr. 13, 1954 |
| 2,688,627 | Cohen et al. | Sept. 7, 1954 |
| 2,716,662 | Cohen et al. | Aug. 30, 1955 |

FOREIGN PATENTS

| | | |
|---|---|---|
| 924,752 | Germany | Mar. 7, 1955 |

OTHER REFERENCES

Elseviers' Encyclopedia, vol. 13, p. 1030 (1946).